April 5, 1966      T. B. DUNNING      3,244,327
DISPENSER FOR GRANULAR MATERIAL
Filed Feb. 18, 1965      2 Sheets-Sheet 1
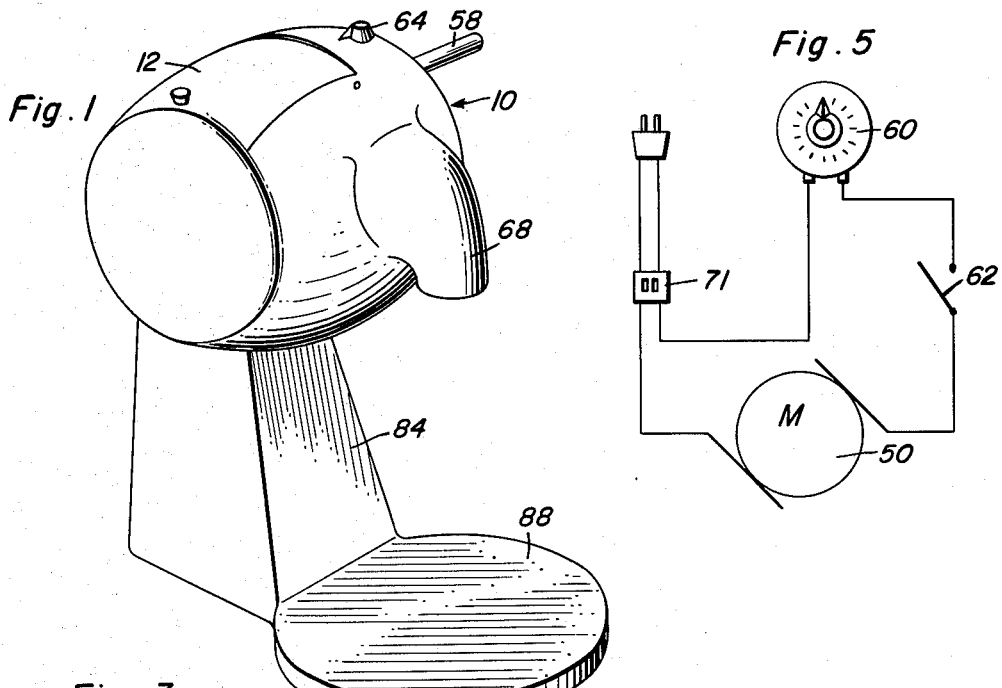
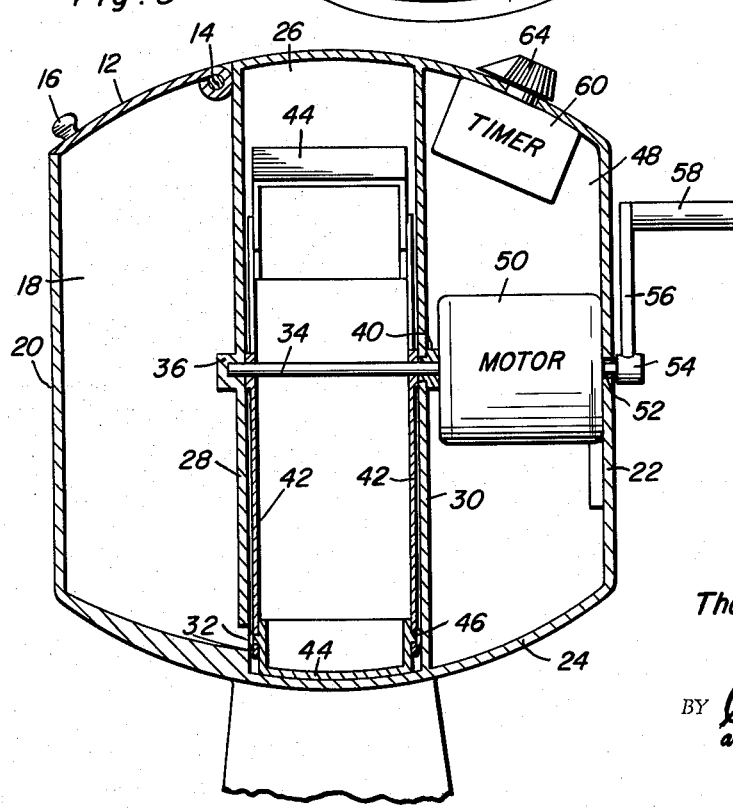
Thomas B. Dunning
INVENTOR.

April 5, 1966     T. B. DUNNING     3,244,327
DISPENSER FOR GRANULAR MATERIAL

Filed Feb. 18, 1965     2 Sheets-Sheet 2

Thomas B. Dunning
INVENTOR.

3,244,327
DISPENSER FOR GRANULAR MATERIAL
Thomas B. Dunning, 139 Reservoir Ave.,
Central City, Ky. 42330
Filed Feb. 18, 1965, Ser. No. 433,699
3 Claims. (Cl. 222—70)

This invention relates to apparatus for dispensing granular materials and more particularly to an apparatus for dispensing a measured amount of coffee into a coffee pot, or other receptacle in which the coffee is to be used.

Apparatus embodying the present invention is particularly adapted for handling of more or less granular mixture such as coffee, although it will be understood that the invention is not restricted to this use. For purposes of explanation, the following description refers to an apparatus for dispensing coffee. The invention may be used to dispense coffee in a commercial operation where a known quantity of coffee is to be dispensed into a container for making coffee. Also, this invention may be used in the household by wives to dispense coffee into a coffee pot thereby reducing the chores of the housewife required to fill the coffee pot.

The primary object of the invention is to provide a novel apparatus for accomplishing the above functions which is simple and inexpensive, but at the same time thoroughly reliable and effective in operation.

The dispenser of this invention can be either wall mounted, or slipped into a plastic stand to be set on a cabinet top. The dispenser is provided with dippers which are adapted to rotate in the dispensing container, and to pick up granular material along the bottom of the container as the dippers rotate. Means are provided in the bottom of the container to trip dump the dippers into an outlet spout in the bottom of the container, and also means are provided at the bottom of the container to ring a small bell as each measurement is dumped.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the granular material dispenser of this invention;

FIGURE 3 is a sectional view of the dispenser of this invention taken substantially along section line 3—3 of FIGURE 2;

FIGURE 5 is a schematic view of the circuit for controlling the motor for regulating the dispensing operation.

Figure 2:
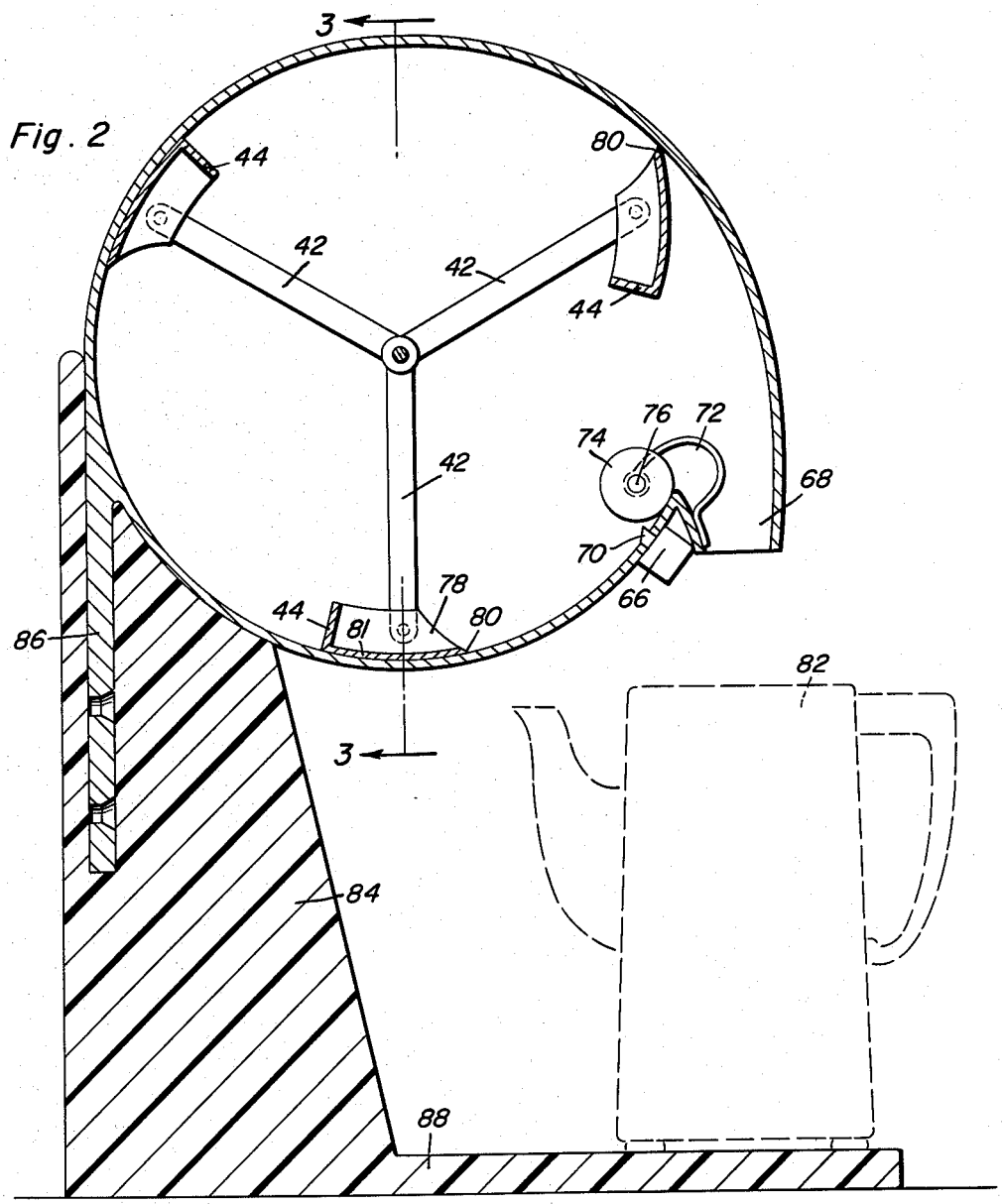
FIGURE 2 is a vertical sectional view of the granular dispenser taken through the center thereof, and showing the coffee pot in dotted lines positioned on the dispenser for receiving granular material from the dispenser.

Now referring more particularly to the drawings the dispenser 10 has a lid 12 thereon which is hinged at 14 on the top of the dispenser, and is provided with a knob 16 for lifting the lid 12 whereby the storage compartment 18 may be filled with granular material to be dispensed. The dispenser 10 comprises parallel end walls 20, and 22, and a substantially spherical shaped peripheral wall 24. The dispenser is divided into a storage compartment 18 by a partition 28, and into a dispensing compartment 26 by a partition 30. The partition 28 which separates the storage compartment 18 from the dispensing compartment 26 has an opening 32 near the bottom thereof, which opening is adapted to allow granular material stored in the storage compartment 18 to discharge or flow into the dispensing compartment 26. The amount of granular material which is allowed to enter the dispensing compartment will be regulated by the size of opening 32, and by the frictional nature, and angle of repose of the granular material entering the dispensing compartment 26. It is obvious that the amount of material which is in the dispensing compartment 26 will be substantially less than the amount of material which is stored in the storage compartment 18 when the storage compartment is full because of the nature of the opening 32.

An axle member or shaft 34 is secured in the dispensing compartment by a bearing 36 provided on the partition 28 and by a bearing 40 mounted in the partition 30. Arms 42 extend radially from a hub mounted on the shaft 34, and the hub is press-fit thereon so that the arms will rotate with the shaft 34. At the outer end of the arms 42 a dipper 44 is mounted by means of rivets 46 or equivalent fasteners. The arms 42 are mounted on each side of the dipper 44 and are adapted to carry the dipper therebetween. The shaft 34 extends through the partition 30 and into a third chamber 48, where the shaft 34 is connected to a motor 50, which is adapted to rotate the shaft 34 and the arrms 42 mounted thereon. The shaft 34 extends beyond the end wall 22 of the dispenser through an aperture 52 provided therein and is connected to a hub 54 by a press fit, or other securing means. The hub 54 is part of a crank lever 56 which has a handle 58 mounted at its free end for rotation of the lever 56 and shaft 34. Thus it can be seen that the shaft 34 together with the arms 42, and dippers 44 may be rotated either by the motor 50, or manually by the lever arm 56. The motor 50 is electrically connected to a timer 60 mounted on the wall 24 of the dispenser, which timer is adapted to break a switch 62 in the circuit between the timer, and motor after a predetermined period of operation of the dispenser. The timer 60 has a knob 64 thereon which is calibrated to allow an operator of the dispenser to select the amount of time that the dispenser is to operate when using the motor.

A bell 66 is located at the bottom surface of the dispenser adjacent to a dispensing spout 68. The bell 66 has an actuator 70 projecting into the interior of the dispenser, which will be struck by the dipper 44 each time that the dipper passes to thereby ring the bell 66. Thus when the dispenser is operated mechanically by the lever arm 56 and handle 58 or by the motor 50, the number of dips scooped into the spout 68 can be counted by counting the rings of the bell 66 as the dipper 44 passes over the actuator 70. A trip mechanism is provided in the spout 68, which comprises a bowed flat spring 72 and a roller 74 connected to the flat spring 72 by a pin 76.

The dippers 44 have an arcuate front edge 78 which curves downwardly to a relatively sharp point 80 on the dipper. In operation of the dispenser, the relatively sharp edges 80 are adapted to strike against an inclined surface on the actuator 70. The arcuate surfaces 78 on the dippers 44 are adapted to catch against the roller 74 as the dispenser passes over the spout 68, whereby the dipper will be tilted by the roller, as the roller moves out over the spout by the uncoiling of the flat spring 72 to empty the contents of the dipper 44 into the spout 68, and into a container such as a coffee pot 82 positioned under the spout.

Figure 4:
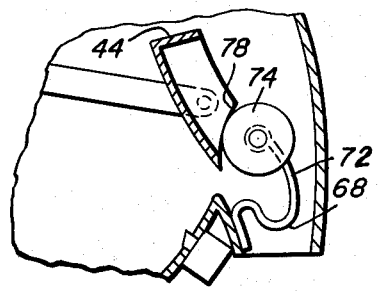
FIGURE 4 is an enlarged fragmental sectional view of the spout, trip mechanism, dippers, and bell of this invention.

The arms 42 are connected to the dippers 44 at a location in front of the center of gravity of the dippers 44. Thus after the dippers have been tripped by the roller 74 and the flat spring 72 to the emptying position shown in FIGURE 4, the dippers will continue to rotate with a snap action to an inverted position in which position the top portion of the rear end of the scoop will engage the roller 72 to terminate rotation of the scoop. Thereafter, as the arms 42 continue to rotate, the scoop will be moved upwardly away from the roller 72 and be allowed to swing, by gravity, to an upwardly opening position with the point 80 of the dipper pointed upward toward the inner cylindrical surface of the substantially spherical shell 24. As the point 80 engages the inner surface, the dipper 44 will be forced into a cooperating engagement with the inner surface of the shell 24, whereby the relatively sharp edge 80 will be positioned to scoop the granular material from the bottom of the dispensing compartment 26 upon its next rotation through the bottom of the compartment. The force of gravity will hold the sharp edge 80 against the inner surface of the shell 24 when the dippers are in a position in the upper half of the dispensing compartment 26. The rear edge of the dippers 44 will be held against the inner surface of the shell 24 when the dippers are manipulated in the bottom half of the dispensing compartment 26 and the configuration of the inner surface of the shell 24 will hold the arcuate bottom 81 of the dippers so that the leading edge 80 is positioned to scoop the granular material from the bottom of the dispensing compartment 26.

The substantially spherical dispenser 10 is mounted on a base 84 by means of a tongue 86 provided on the dispenser, which tongue 86 is adapted to be received within a slot provided therefor in the base 84. The top surface of the base 84 is arcuately curved to receive the substantially spherical shell 24 of the dispenser thereon in a relatively smooth fit. The base 84 has a flat projecting flange 88 at the bottom thereof, which flange is positioned under the spout 68 to receive the container such as the coffee pot 82 under the spout 68, whereby the coffee pot, or other container may be filled with granular material to be dispensed from the dispenser.

In the operation of the granular material dispenser of this invention, the storage compartment 18 is filled with the granular material, such as coffee to be dispensed by lifting the lid 12 about the hinge 14, and emptying the material to be dispensed into the storage compartment 18. The granular material will flow through the opening 32 in the partition 28 between the storage compartment 18 and the dispensing compartment 26, into the dispensing compartment 26 and come to rest along the bottom portion of the dispensing compartment 26. Then, in the event the machine is to be automatically run, the timer is set, according to the calibrations thereon, to dispense a particular amount of granular material into a container placed under the spout 68. The motor 50 will automatically rotate the shaft 34, together with the dippers 44. The dippers 44 will be emptied into the spout 68 as they pass the roller 74 and flat spring 72 until the desired amount of granular material has been emptied into the container as predetermined by the setting of the timer 60. In the event that the dispenser is to be manually operated the crank lever 56 may be rotated by manually manipulating the lever by means of the handle 58 provided thereon, and counting the rings of the bell 66 as the dippers pass thereover. When the desired number of dippers have passed over the bell, this operation may be ceased and a desired amount of granular material will have been emptied into the container provided under the spout 68.

As illustrated in FIGURE 5 a plug-in outlet 71 is provided in the motor circuit so that other appliances such as a coffee pot can be plugged into the outlet.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A dispensing apparatus comprising a container having a substantially cylindrical inner surface, a dispensing arm rotatable through said container about a horizontal axis mounted in said container, a dipper including a bottom wall having front and rear ends, said dipper being pivotally affixed to the extremity of the dispensing arm on an axis substantially parallel to the first-named axis and in front of the center of gravity of the scoop, said dipper rotating in the upper half of the container with the forward end forwardmost and the forward end of said bottom wall resting by gravity on the cylindrical surface and the forward edge of said bottom wall smoothly scraping along the cylindrical surface due to the configuration of the dipper, said cylindrical surface including a portion extending in a direction opposite to the direction of rotation of said arm and from an upper portion thereof increasing in radius of curvature and terminating in a lower portion of said container, said cylindrical surface having a downwardly opening dispensing opening formed therein in the bottom portion thereof and whose radial outermost extremity is defined by the lower end of said portion of said cylindrical surface increasing in radius of curvature, tripping means on said container adjacent said opening engageable by said dipper and operative to pivot the front end of said dipper outwardly and rearwardly relative to the direction of movement of said arm to an emptying position as said dipper moves into registry with said opening and to thereafter, in sequence and in response to continued movement of said arm, pivot the front end of said dipper further rearwardly and inwardly in a snap movement to a limit position with the dipper opening upwardly and downwardly and subsequently allow said dipper to further pivot to an upwardly and inwardly opening position as said dipper is swung past said tripping means for engagement of the forward portion of the bottom wall of said dipper with said portion of said cylindrical surface increasing in radius of curvature.

2. The combination of claim 1 wherein said container is divided into a storage compartment for storing granular material and a dispensing compartment by a flat wall in the container, said arm and said dipper being swingable through said dispensing compartment, an opening in said flat wall adjacent the lowest portion of said cylindrical surface to allow granular material stored in said storage compartment to be discharged by gravity into said dispensing compartment.

3. The combination of claim 1 including motor means connected to said arm for rotating said arm in said container and second means on said container for energizing and then de-energizing said motor after expiration of a predetermined time interval.

References Cited by the Examiner

UNITED STATES PATENTS

| | | | |
|---|---|---|---|
| 651,516 | 6/1900 | Stokes | 222—369 X |
| 1,083,129 | 12/1913 | Paolvcci | 222—357 |
| 1,257,214 | 2/1918 | Graham | 222—357 |
| 2,433,478 | 12/1947 | Nelson | 222—369 X |
| 2,770,396 | 11/1956 | Vernig | 222—70 |

FOREIGN PATENTS 148,482   1/1937   Austria.

LOUIS J. DEMBO, *Primary Examiner.*

HADD S. LANE, *Examiner.*